(12) United States Patent
Cook et al.

(10) Patent No.: US 9,491,409 B2
(45) Date of Patent: Nov. 8, 2016

(54) NETWORK INTERFACE TO CONTENT SOURCE

(75) Inventors: Michael J. Cook, Flemington, NJ (US); James S. Poder, Cheltenham, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 320 days.

(21) Appl. No.: 12/609,625

(22) Filed: Oct. 30, 2009

(65) Prior Publication Data

US 2011/0106962 A1   May 5, 2011

(51) Int. Cl.

| | | |
|---|---|---|
| G06F 15/16 | (2006.01) |
| H04N 7/173 | (2011.01) |
| H04N 5/85 | (2006.01) |
| H04N 21/418 | (2011.01) |
| H04N 21/426 | (2011.01) |
| H04N 21/4363 | (2011.01) |
| H04N 21/472 | (2011.01) |
| H04N 21/482 | (2011.01) |
| H04N 21/658 | (2011.01) |

(52) U.S. Cl.
CPC ............ *H04N 7/17318* (2013.01); *H04N 5/85* (2013.01); *H04N 21/4184* (2013.01); *H04N 21/42646* (2013.01); *H04N 21/43637* (2013.01); *H04N 21/47202* (2013.01); *H04N 21/482* (2013.01); *H04N 21/6581* (2013.01)

(58) Field of Classification Search
CPC .......... H04N 5/44543; H04N 21/482; H04N 21/4312; H04N 21/44209; G06F 3/0482
USPC ................................. 709/203, 231
See application file for complete search history.

(56) References Cited

U.S. PATENT DOCUMENTS

| | | | | |
|---|---|---|---|---|
| 6,766,376 B2 * | 7/2004 | Price | ................ | H04L 29/06027 |
| | | | | 348/E5.008 |
| 7,376,757 B2 * | 5/2008 | Smith | ............................. | 710/5 |
| 7,774,708 B2 * | 8/2010 | Bell et al. | ..................... | 715/738 |
| 7,908,636 B2 * | 3/2011 | Drazin | ............... | H04N 5/44543 |
| | | | | 711/162 |

(Continued)

FOREIGN PATENT DOCUMENTS

| | | |
|---|---|---|
| EP | 1202466 | 5/2002 |
| EP | 1501017 | 1/2005 |

OTHER PUBLICATIONS

How does the Eye-Fi card work?, http://www.eye.fi/how-it-works/basics, © 2010 Eye-Fi, Inc., 3 pages, Mar. 2, 2010 website printout.

(Continued)

*Primary Examiner* — Duyen Doan
(74) *Attorney, Agent, or Firm* — Banner & Witcoff, Ltd.

(57) ABSTRACT

Disclosed are systems and methods in which a media player is connected via an interface device over a network to a source of content. Some conventional media players such as DVD players and televisions are equipped with hardware to render content disposed on and playable from a removable memory device, in particular a SD card. A memory card may be equipped with networking functionality, in particular, WI-FI networking, to enable connectivity over a local area wireless network. The memory card further may be provided with a processor. By providing an interface device that includes a processor, networking functionality, and storage, with suitable software on the storage, the media player may be connected over a network to locally networked or remote content sources. In some embodiments, the interface device also includes its own locally stored content.

28 Claims, 6 Drawing Sheets

(56) References Cited

U.S. PATENT DOCUMENTS

| | | | |
|---|---|---|---|
| 7,966,355 B2* | 6/2011 | Sherman | G06F 3/0605 707/824 |
| 8,195,635 B1* | 6/2012 | Lee et al. | 707/706 |
| 2004/0068536 A1* | 4/2004 | Demers | G06F 17/30899 709/201 |
| 2004/0268041 A1 | 12/2004 | Smith | |
| 2007/0266065 A1* | 11/2007 | Rosenberg | G06F 17/30053 |
| 2008/0244644 A1* | 10/2008 | McCausland | 725/37 |
| 2009/0049074 A1* | 2/2009 | Dara-Abrams | G06F 17/30017 |
| 2009/0080870 A1* | 3/2009 | Mudie | H04N 5/76 386/232 |
| 2009/0248702 A1* | 10/2009 | Schwartz | G06F 17/30029 |

OTHER PUBLICATIONS

Eyefi Linux Hacking, Freestanding Server, http://dave-hansen.blogspot.com/2008/12/freestanding-server.html, 4 pages, Mar. 5, 2010 website printout.

Return Boolean True, Eye Fi Standalone Server, Eye Fi Linux Hacking, http://returnbooleantrue.blogspot.com/2009/01/eye-fi-standalone-server.html, 33 pages, Mar. 5, 2010 website printout.

EP 10189263 Partial European Search Report dated Aug. 26, 2011.

* cited by examiner

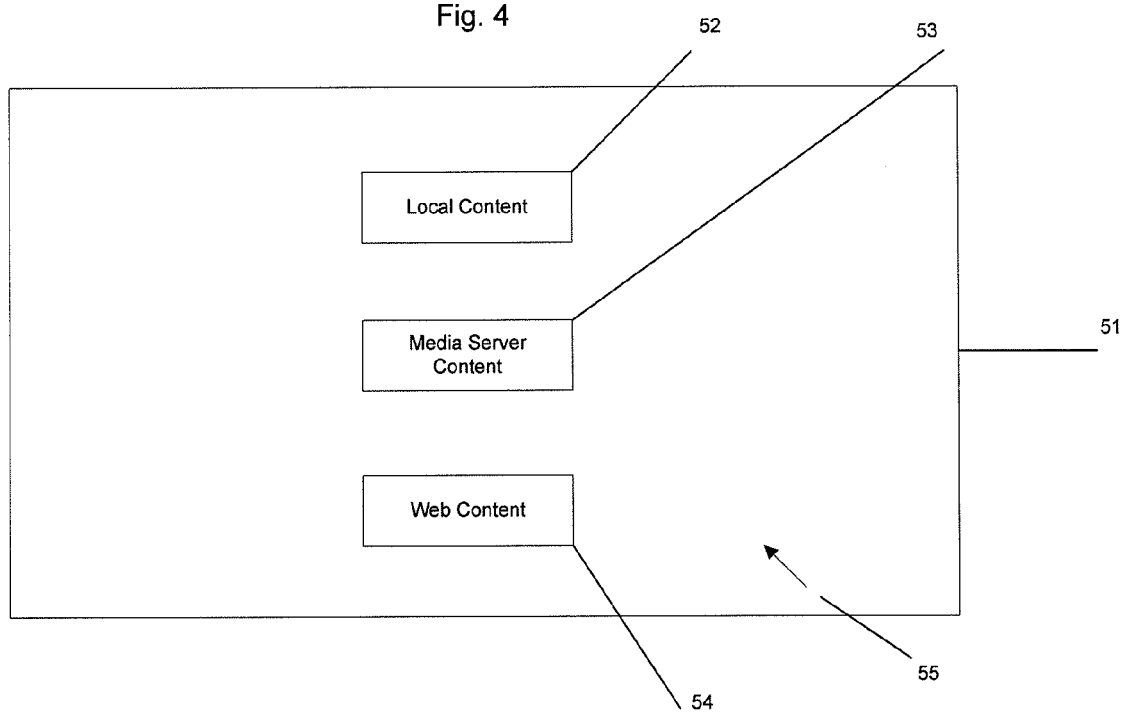
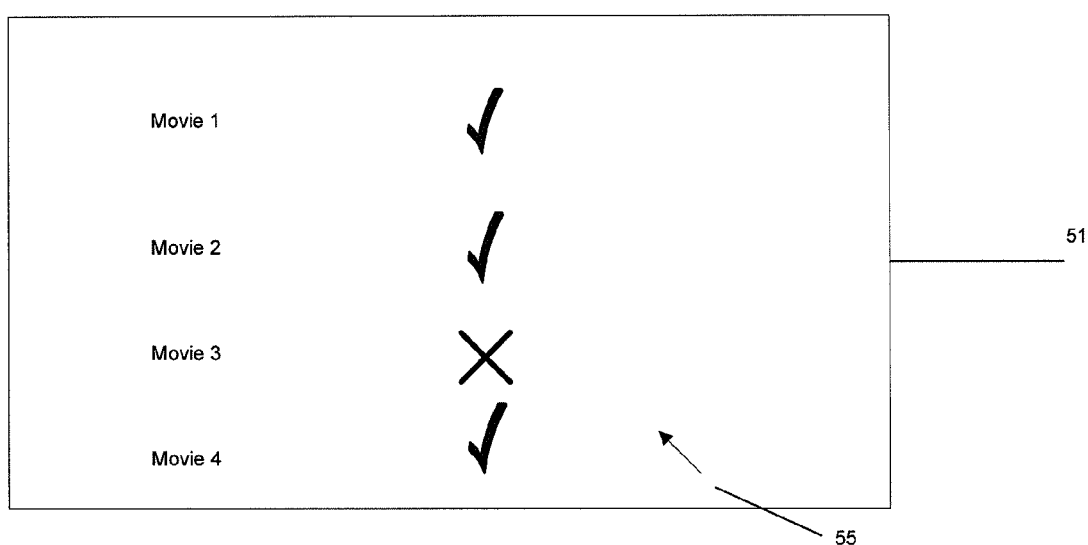

NETWORK INTERFACE TO CONTENT SOURCE

TECHNICAL FIELD

Aspects of the disclosure relate to delivery of content over a network to a media player. Some embodiments of the disclosure relate to use of a network interface device, such as a secure digital (SD) card equipped with a wireless network interface, to connect a media player over a network to a source of content.

BACKGROUND

Many media players, such as televisions, set-top boxes, and DVD players are known. Some such devices are equipped with networking connectivity, to enable receipt of content from a network source. Some media players, however, lack network connectivity. Typically, such media players must be connected physically to a source to acquire content. For instance, a conventional DVD player typically is not equipped with network connectivity and can play only compatible disk-based media.

Recently, manufacturers of many such media players have been equipping the players with external memory readers, such as SD card readers. Such readers are designed to permit rendering of content contained on the memory card. A typical use of such memory cards with media players is the display of photographs on a television set. When a media player is provided with a memory card reader, the content playable by the media player is limited to the content natively playable by the player or available on the SD card.

Recently there has become available a SD device that includes an integrated wireless networking (WI-FI) connection. This SD device is used principally for wireless downloading of images from digital cameras onto personal computers.

SUMMARY

It is now contemplated that, using an interface device, which in some embodiments may be the heretofore described wireless-equipped SD device, a media player may be provided with an interface between the media players and a source of content. The interface device may be provided with a processor, storage, and a network interface, in particular, a wireless network interface and especially a WI-FI interface. The interface device may be provided with software, which comprises computer-readable program code executable by the processor. The software may provide any one or more of a number of different functions as described herein, and in general the device includes an interface to a networked content source. In accordance with some embodiments, the software provided in the interface device include an interface to an internet service, and an interface to a DLNA server or other locally networked media server. The software further may include a content aggregator, a file system interface, and transcoding and decryption software. The interface device may also include its own content contained in the storage.

Thus, a media player, such as a DVD player that is equipped with a SD card reader, may be provided with a WI-FI equipped SD card as described herein. The SD card may be equipped with software interfaces to various media sources, and also may have its own local SD content. When the card is accessed, the user may be provided with a menu for selection of local SD content, local DLNA content or remote internet content. Via this menu or a series of submenus, the user may select content to be rendered on the media player. It is contemplated that some content may be delivered to the SD card via a network, in particular a local wireless network, ultimately from a DLNA media server or an internet server.

BRIEF DESCRIPTION OF THE DRAWINGS

FIG. 4 is an exemplary screen shot illustrating a menu structure visible to the user as a component of the user interface of the media player system illustrated in FIG. 1.

FIG. 5 is a representation of a screen shot illustrating a submenu accessible after selecting a menu item of FIG. 4.

DETAILED DESCRIPTION

Figure 1:
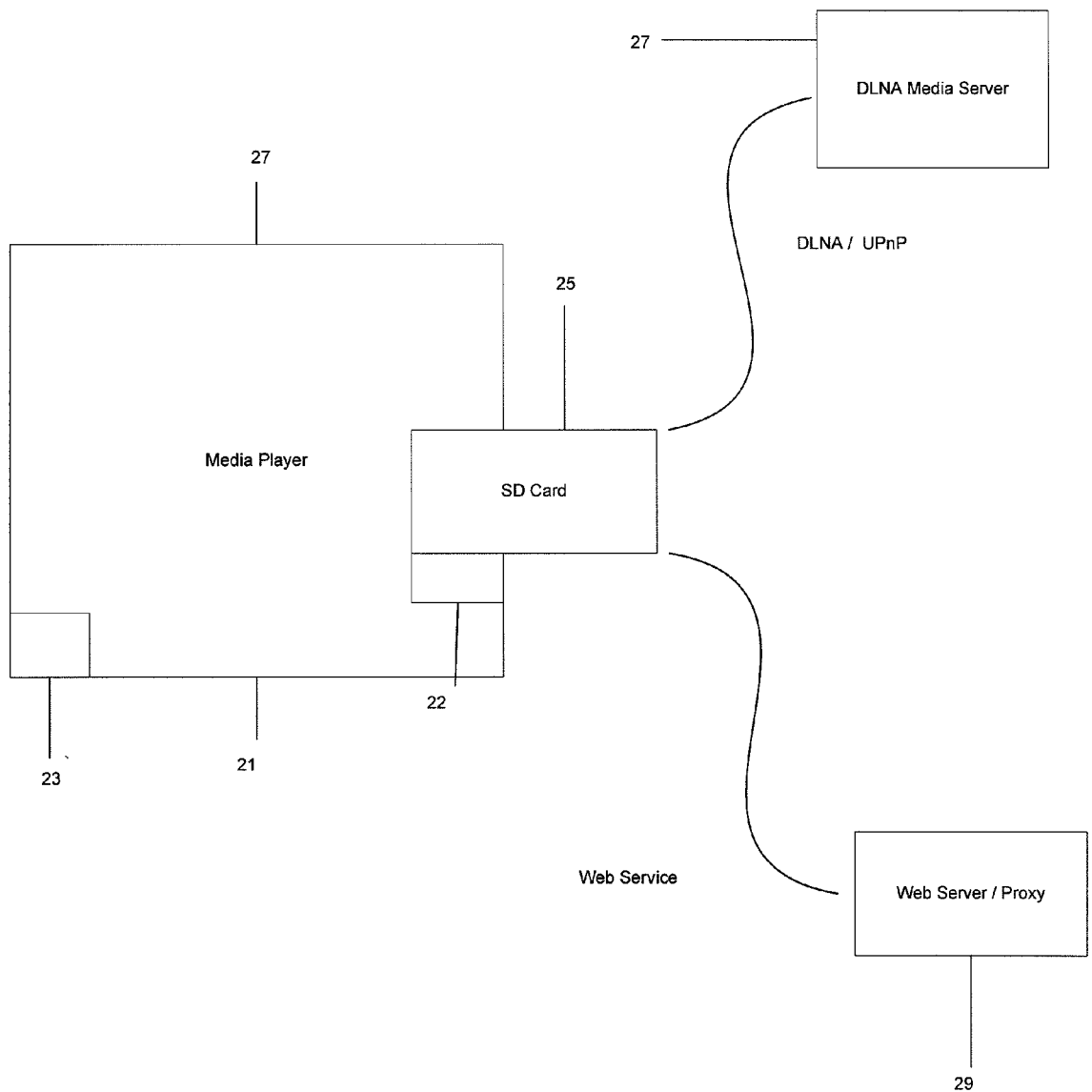
FIG. 1 is a representation of a media player system in accordance with one embodiment of the disclosure and of content sources, the system including a media player having a memory card interface, and an interface device operably connected to the memory card interface and connectable via a wireless network to the content sources.

The disclosure is contemplated to be applicable in connection with a variety of media players including DVD and BLU-RAY® players, televisions, electronic picture frames, set-top boxes, and generally any media player that is equipped with an interface for a removable memory device. The memory interface may be a SD card reader or like external memory reader. The media player may be a set-top box or other device that does not itself display the content but that generates an output signal for a connected device such as a television. The media player may have no network connectivity at all (e.g., a conventional DVD player) or may be connectable to one type of network but not another (e.g., a cable set-top box may be connectable to a cable television network, but not to a local area network maintained by a consumer).

The disclosure is deemed to contemplate, in various alternative embodiments, the software, systems, methods, and devices as described herein. In one embodiment, the disclosure contemplates a media player system, and another embodiment, the disclosure contemplates an interface device usable in connection with a media player system. The interface device is usable in connection with an external network and with content sources accessible over the network. In these embodiments, the disclosure is contemplated to encompass the device and system respectively even in the absence of a network or in the absence of content sources. For this reason, reference to hardware or software, such as a "network interface" or "interface to remotely networked content," is intended to connote hardware or software that is capable of functioning in connection with a network or with networked content, and is not limited to use in connection with a network or any content sources. The software described herein may be implemented in any suitable form of computer-readable program code.

As heretofore described, many media players are sold commercially with memory card readers. Such media players typically include rendering hardware and an interface for the memory card. Some media players are limited to the rendering of content from the SD or other memory card (e.g., an electronic picture frame). Other media players are able to render content from plural sources including the memory card and at least one other internal or external source (e.g., television, DVD players). The rendering hardware typically includes one or more of a screen, speakers, connections and appropriate hardware for external output devices, and the like. Most media players include at least a rudimentary (and sometimes a very sophisticated), user interface to permit the user to interact with the media player. By way of example, conventional DVD players include control systems that enable a user to control the rendering of media played in the DVD player, for instance, by pausing, skipping chapters and the like. As heretofore indicated, many such media players are provided with a memory card reader, which is an interface to a removable memory card and via which content disposed on a removable memory card may be rendered by the media player.

Common types of memory card devices are sold by various manufacturers as "SD card" devices. SD cards are deemed to be those compatible with various standards promulgated by the SD Card Association, c/o Global Inventures, Inc., 2400 Camino Ramon, Suite 275, San Ramon, Calif. 94583. Currently, the SD Card Association promulgates several standards, including the standard SD card, the miniSD card and the microSD card, each in standard capacity (up to 2 GB) high capacity (4 GB or larger), and extended capacity (32 GB or larger) in the case of the SD and microSD cards. Each SD card includes a processor and storage.

Some SD cards are provided with network connectivity, the principal use of which to enable downloading of images from SD-enabled cameras to personal computers over wireless networks. In accordance with some embodiments, a SD card may be provided with any suitable network interface, including any wired or wireless interface, especially including a WI-FI interface for enabling connectivity to local or remote networks over a local area wireless network. Other suitable connection protocols include any Layer 2 wireless network technologies, such as WI-MAX or EV-DO. One such family of products is available from Eye-FI, Inc. of 305 West Evelyn Avenue, Mountain View, Calif. 94041. These products are presently deemed suitable for use in conjunction with some embodiments of the disclosure. Such devices are purported to be described in U.S. Patent Publication 2004/0268041. The disclosure is not deemed to be limited thereto, but to the contrary is contemplated to be useful in conjunction with any interface device having a processor, storage, and network interface.

Via such an interface device, the media player is able to render content from one or more sources of content. Generally, the interface device should be compatible with the memory interface of the media player, such that the interface device may communicate with the media player through the player's memory interface. The SD card or other interface device may itself include content disposed in the storage of the interface device (for instance one or more photographs, movies, songs, ringtones, or the like). Additionally, the interface device may be used to connect to local network sources of content and/or remote sources of content. Local sources of network content are contemplated to encompass any suitable content on storage of a device connected to a local area network accessible via a local network interface. Exemplary sources of content are content servers compatible with the specifications promulgated by the Digital Living Network Alliance, c/o DLNA Administration, 3855 Southwest 153$^{rd}$ Drive, Beaverton, Oreg. 97006. Any suitable DLNA server may be used as a content source. In these embodiments, the interface device includes software functions as an interface to the locally networked content.

In other embodiments, not mutually exclusive with respect to the foregoing embodiments, the interface device is provided with software that functions as an interface to a remote network content source. In these embodiments, the remote content source may be, for instance, a source accessible over a global network, e.g., the Internet. In some embodiments, the interface may connect directly to the content source, while in other embodiments, the interface device may connect to a proxy. A suitable proxy may contain a list of available content and a pointer to the content itself on the same or another source. Generally, it is contemplated that, although it may be possible to deploy a full http (web) browser to enable access to content widely dispersed on a global network, in some embodiments this will not be done. In some embodiments, a list of preselected content may be prepared by a third party service provider. In such case, via the interface device, the media player will be caused to connect to the third party source. In such embodiments, the third party source periodically may update or refresh the content lists.

Also disposed in the storage of the interface device may be a content aggregator. The content aggregator is software that is provided to present a menu structure, such as a folder structure, that includes a list of available content. Initially, for instance, the content aggregator may provide the user with the option to select locally available card content, locally available networked content, or remote networked content. Upon selection of one of these three types of content, if there are multiple content choices available, the content aggregator may present a list of available content to the user. In such embodiments, the menu structure and list of available content are provided to the user via the media player, and selections are made via the user interface and input devices of the media player. For this reasons, the interface device also includes suitable hardware and software interfaces to enable interaction by the user with the interface device for appropriate selection of content.

When content is provided from a local or remote network sources through the media player through the interface device, it is contemplated that in some embodiments the entirety of the content will be delivered to the interface device and stored entirely in the storage before the beginning of the process of rendering the content. In other embodiments, however, particularly in the case of multimedia content such as full-length movies, it is contemplated that the content will be streamed over the network to the interface device. In such cases, the content will be only partially delivered when the media player begins to render the content, and the content will continue to be delivered after the contents has begun to play. The SD card specification provides for buffering of data, such that, in connection with embodiments described herein, content may be streamed to the device and may be stored in storage as the content is delivered to the media player. In many cases, the speed of delivery from the source over the network to the storage of the interface device will be greater than the speed of which the content is transferred from the device to the media player. In such cases, streamed delivery of content from the source to the media player via the interface device without interruption will be possible.

It is contemplated that, in some embodiments, once content has been received from a source, it may remain latent and stored in the storage of the device. In other embodiments, it is contemplated that the content, once rendered, will be erased from the interface device or otherwise inaccessible. In many cases, copy-protection schemes will prevent or limit the latency of content.

Other software may be disposed in the storage of the interface device. For instance, the device may include delivery software for delivering the content to the media player, especially if the software is designed to supplant or augment the software or hardware of the media player. In some embodiments, the interface device may be intended for us with content that is provided with content protection (copy-protection). In such instances, the storage might be provided with decryption software to enable the media player to render the protected content. Additionally, in some embodiments, the interface may be provided with transcoding software. The transcoding software is designed to transcode content that is otherwise not playable by the media player into content that is playable. For example, if the media player is a standard definition DVD player, and a media source includes a high definition movie that is otherwise not playable on the media player, via the transcoding software the high-definition movie may be downgraded to a format that is renderable by the media player.

The interface device may be provided with "handshake" software that communicates with the media player and that advises the interface device of the type of media player and/or the types of content that may be rendered by the media player. In other embodiments, not mutually exclusive with respect to the heretofore embodiments, the interface device may be programmable by the user such that, in an initial set up mode, the user may define the type of media player and/or the types of content that the media player is capable of rendering.

Figure 2:
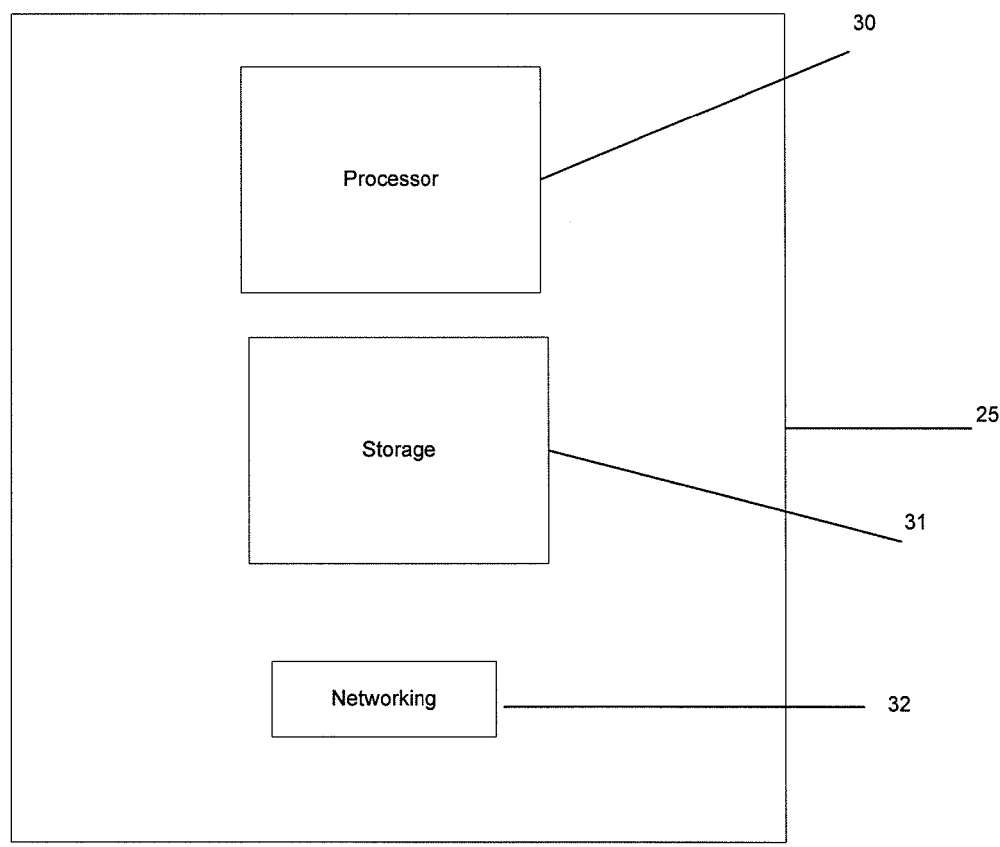
FIG. 2 is a representation of an interface device useful in connection with some embodiments of the present disclosure.

With reference now to FIGS. 1 and 2, the illustrated system 20 includes a media player 21 having an interface 22 for a memory card, rendering player hardware 23, and an interface device 25 which, in this illustrated embodiment, comprises a SD card equipped with a processor 30, storage 31, and a network interface 32 (shown in FIG. 2). The rendering hardware 23 may be any suitable device such as a display screen, speakers, input/output software and hardware, or the like. The media player 21 is connectable over a network to a local network content source 27, which in this embodiment is a DLNA media server. The media player also is connectable via the SD card to a web server or proxy 29. Any suitable networking protocols may be used to enable a connection to the local and remote content sources respectively. In the case of the DLNA media server, the protocol may be DLNA/UPnP. In the case of a remote content source, any suitable internet protocol, such as UDP or http, running over TCP and/or IP, may be employed.

Figure 3:
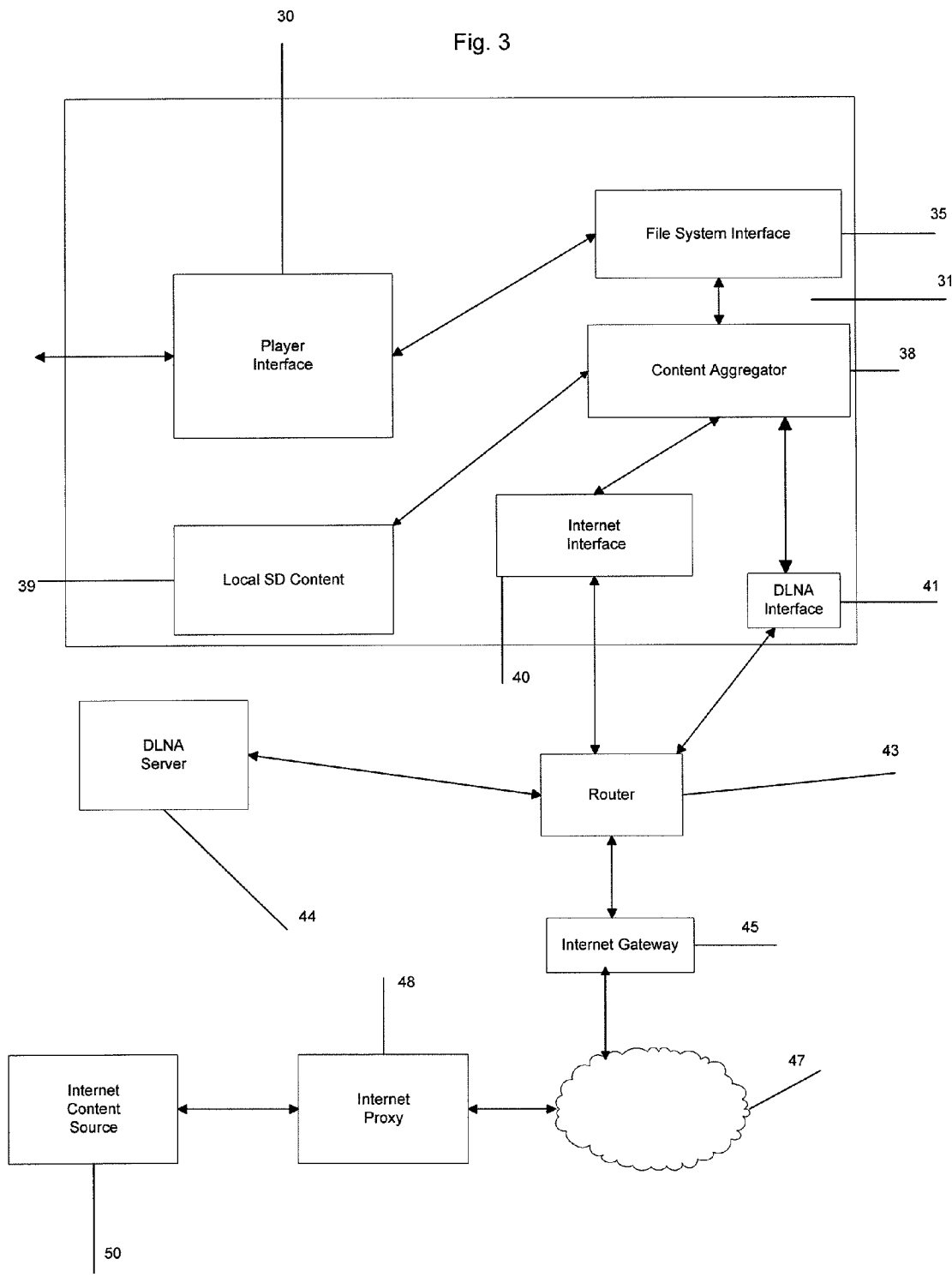
FIG. 3 is a representation of a network structure that includes an interface device as heretofore described, further illustrating software disposed on the storage of the interface device.

As illustrated in FIG. 3, the storage 31 of the interface device may be provided with various software functionalities. The interface device is equipped with a file system, which may be, for instance, a FAT 16 or FAT 32 file system or other suitable file system. In the illustrated embodiment, the SD card storage 31 includes a file system interface 35 which connects to the player interface 36 and which enables the user to interact with the interface device. The storage 31 further includes a content aggregator 38 which communicates respectively with any local SD content 39 disposed on the interface device 25 and with an internet interface 40 and DLNA interface 41. As heretofore described, the content aggregator provides a menu structure that enables the user to select from among desired types of content to be rendered on the player. The internet interface is provided to allow for selection and rendering of content from a remote content source, while the DLNA interface is provided to enable selection of and rendering of content from a local DLNA server.

In the illustrated embodiment, the internet interface and DLNA interface operably connect to a router 43 (via the network interface 32, not illustrated in FIG. 3). The router is connected with the network to a DLNA server 44 and to an internet gateway 45, which connects via the internet (shown as cloud 47) to an internet proxy 48. The internet proxy 48 is a server that provides a list of, and pointers to, preselected content. The internet proxy 48 itself communicates with an internet content source 50. In this embodiment, a single internet content source is depicted, but multiple content sources also are possible, and the content source 50 may be on the same server as the proxy 48. Also, the internet content source 50 is depicted as being connectable to the interface device 25 via the internet proxy 48, but an alternative network path also is possible.

As heretofore described, the internet proxy 48 may provide a list of content preselected by a third party, for instance, in accordance with criteria specified by the user. The third party may maintain a list of categories ("sports films," "classic movies," "instructional videos," etc.), and, via the media player and interface device, or via a separate mechanism, the user may be presented with a list of content sources in one of those categories.

If the user elects to render locally networked content via the DLNA server, the content is provided to the interface and player. Again, a single DLNA server is illustrated, but multiple DLNA servers may be provided on a single local area network. The DNLA server may provide a preselected list of content or preselected categories.

Figure 6:
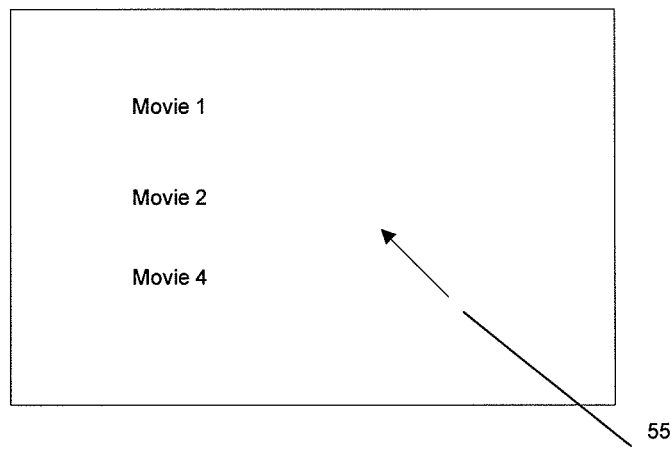
FIG. 6 is an alternative representation of a screen shot illustrating a different submenu visible to the user after selection of a menu item in FIG. 4.

As illustrated in FIGS. 4 to 6, the user interface in this case is a screen 51. The content aggregator generates a user interface having a display that provides the user with multiple choices, including local content 52, media server content 53, and web content 54 as illustrated in FIG. 4. If there is no local content, this option may be unselectable or may not be visible to the user. Similarly, if there is no media server content or web content, or if there is no network active, these options likewise may be unselectable or may be invisible to the user. Via a cursor 55 or other selection mechanism of a user interface, a user may select one of these menu items.

If, upon selection of one of the menu items 52-54 (say, media server content 53), there are four choices available, these four choices may be listed, as illustrated in FIG. 5. In this embodiment, as illustrated the media player is a conventional DVD player, and Movies 1, 2 and 4 are standard definition DVD movies. Movie 3 is a high definition movie, which is not playable on the DVD player. As illustrated, all four movies are indicated as being present on the media player. Movies 1, 2 and 4 are indicated as being playable (this indicated by the "√" symbol next to the title of the movie). Movie 3 is indicated as not being playable (this indicated by the "X" symbol next to the title of the movie). In an alternative embodiment, Movie 3 would not be listed at all, as illustrated in FIG. 6.

Figure 7:
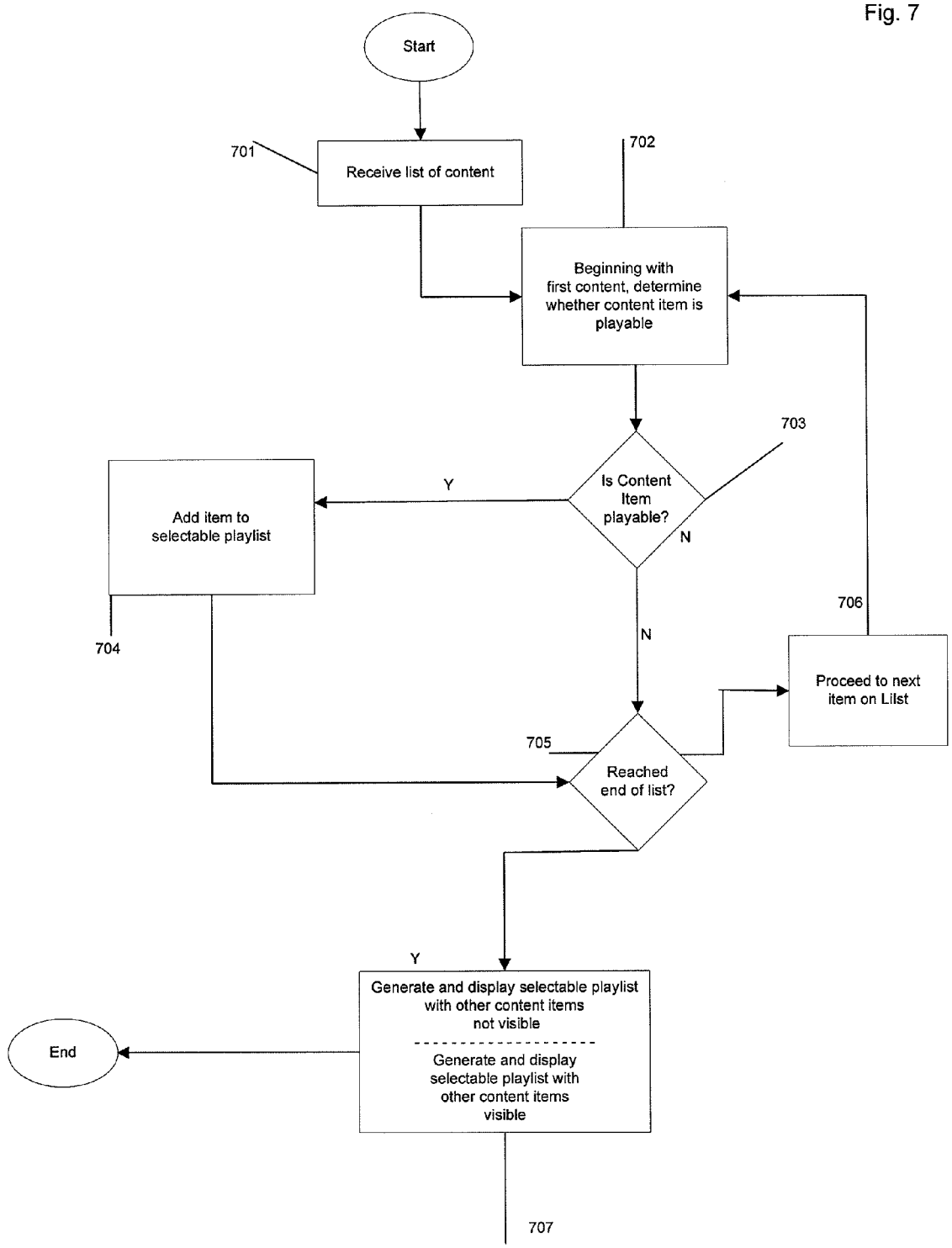
FIG. 7 is a flow chart illustrating steps in two alternative methods for displaying a selectable playlist of content on the media player.

In generating the heretofore described list of playable content, the general methodology depicted in FIG. 7 may be followed. At step 701, a list of content available from a media source (local content, locally networked content, or remotely networked content, as the case may be) is obtained and received. At step 702, beginning with the first content item on the list, it is determined whether the content item is playable on the media player. If, at step 703, it is determined that the content item is playable, the item is added to a selected playlist at step 704, and the process continues to step 705. If not, control also passes to step 705 where it is determined whether the end of the list of the items of content has been reached. If the end of the list has not been reached, at step 706, the process passes to the next item on the list, and control returns to step 702 to determine whether the item is playable. If, at step 705, the end of the list has been reached, control passes to step 707. This step represents one of two alternatives. At this step, a list such as that illustrated in FIG. 5 or in FIG. 6 may be generated and subsequently displayed, with the other content items not playable on the device being either listed or not listed.

Figure 8:
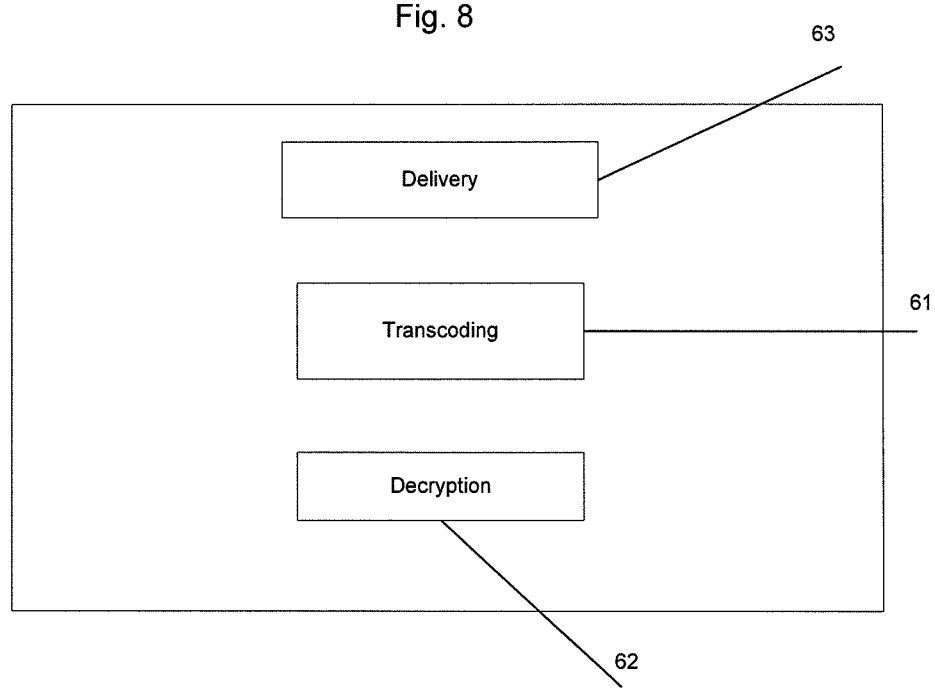
FIG. 8 is a representation of optional software disposed in the storage of the interface device.

In FIG. 8, optional transcoding software 61, decryption software 62, and delivery software 63 are illustrated in the storage 31 of the interface device 25. Any suitable transcoding, delivery and decryption software may be provided. With respect to the decryption software, the interface device may have CPRM (Content Protection for Recordable Media) software. If the interface device is a SD device, this software may be natively included as part of the SD standard. The interface device alternatively or in addition may be provided with DTCP (Disk Transmission Content Protection) software, or other suitable decryption software. CPRM is deemed to be useful for content protection for content disposed on the card itself, while DTCP/DTCP-IP is a useful form of content protection for content acquired from the internet. The transcoding software may be any software capable of converting one content format to another, for purposes of enabling conversion from format not playable by a media player into a format playable by the media player (e.g., .tif image to .jpg image, BLU-RAY® movie to standard DVD movie).

Upon powering up of the media player in connection of the interface device through the network, the interface may initially cache the file names of all the available file names of the system. This may occur before the user accesses the content aggregator menu. If the media player is a DVD player or other player that is able to render content from a source other than an interface device, the interface device may retrieve and cache the content list even before the user has directed the media player to access control from the device. This is to allow the list of available content to be presented to the user quickly, without delay inherent in querying the sources of content when the user first accesses the networked content. The user interface may be provided with the option to refresh the list of available content, or the list of available content may be refreshed at a preselected interval.

In some embodiments, the present disclosure can be partially or wholly implemented on a computer-readable medium, for example, via computer-executable instructions or modules, or via computer-readable data structures. The methods, software, and systems devices of the above-referenced embodiments may also include other additional elements, steps, features, computer-executable instructions, or computer-readable data structures other than those described herein.

It is thus seen that an interface device may be used to provide content to a media player.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The disclosure is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the disclosure and does not pose a limitation on the scope. Any statement herein as to the nature or benefits of the disclosure or of the preferred embodiments is not intended to be limiting. This disclosure includes all modifications and equivalents of the subject matter recited herein as permitted by applicable law. Moreover, any combination of the above-described elements in all possible variations thereof is encompassed by the disclosure unless otherwise indicated herein or otherwise clearly contradicted by context. The description herein of any reference or patent, even if identified as "prior," is not intended to constitute a concession that such reference or patent is available as prior art against the present disclosure. No unclaimed language should be deemed to limit the disclosure in scope. Neither the marking of the patent number on any product nor the identification of the patent number in connection with any service should be deemed a representation that all embodiments described herein are incorporated into such product or service.

What is claimed is:

1. A method comprising:
   communicating, by an interface device, with a media player via a reader of the media player, the reader configured to removably connect additional memory;
   outputting a menu that provides a first option for a first content source corresponding to a local storage of the interface device, and a second option for a second content source that is wirelessly accessible by the interface device; and
   controlling whether the first option and the second option of the menu are selectable based on whether content is available from the first content source and the second content source, respectively.

2. The method according to claim 1, further comprising providing local interface device content stored in the local storage of the interface device to the media player in response to a selection of the first option.

3. The method according to claim 1, further comprising, in response to a selection of the first option, identifying which content of the first content source is renderable by the media player.

4. The method according to claim 1, further comprising providing an interface to the second content source, wherein providing the interface to the second content source comprises providing at least one of an interface to locally networked content or an interface to remotely networked content.

5. The method according to claim 1, further comprising storing local interface device content in the local storage of the interface device.

6. The method according to claim 1, further comprising storing, in the local storage of the interface device, at least two of: software to provide an interface to locally networked content, software to provide an interface to remotely networked content, or local interface device content.

7. The method according to claim 1, further comprising outputting an updated menu that provides one or more content items from the first content source or the second content source and indicates which of the one or more content items are renderable by the media player.

8. The method according to claim 1, further comprising transcoding first content from a first content format into a second content format renderable by the media player.

9. A method comprising:
connecting, by a device, to a memory interface of a media player;
communicating, by the device, with a local storage of the device to make a first determination as to whether first content is available from the local storage;
communicating, by the device, with a network interface of the device to make a second determination as to whether second content is available from a source that is wirelessly accessible via the network interface;
generating, by the device, a menu that provides a first option corresponding to the local storage and a second option corresponding to the source; and
controlling whether the first option and the second option are selectable based on a first result of the first determination and a second result of the second determination.

10. The method according to claim 9, wherein the connecting comprises connecting, by the device, to a secure digital (SD) card reader of the media player.

11. The method according to claim 9, further comprising:
determining which items among the first content are renderable by the media player; and
determining which items among the second content are renderable by the media player.

12. The method according to claim 9, wherein the communicating with the network interface of the device to make the second determination comprises:
determining whether wireless access to a network is active; and
wirelessly communicating with the source via the network.

13. The method according to claim 9, further comprising storing the first content in the local storage prior to making the first determination,
wherein the controlling comprises controlling the first option to be selectable based on the first result of the first determination indicating that the first content is available from the local storage.

14. The method according to claim 9, further comprising outputting an updated menu that provides one or more content items from the first content or the second content and indicates which of the one or more content items are renderable by the media player.

15. The method according to claim 9, further comprising transcoding a first content item, among the first content or the second content, having a first content format into a second content item having a second content format renderable by the media player.

16. A method comprising:
communicating, by a media player, with an interface device via a reader of the media player, the reader configured to removably connect additional memory;
receiving a menu structure that provides a first option for a first content source corresponding to a local storage of the interface device, and a second option for a second content source that is wirelessly accessible by the interface device; and
outputting a menu according to the menu structure, wherein the menu is configured such that the first option and the second option are selectable if content is available from the first content source and the second content source, respectively.

17. The method of claim 16, wherein receiving the menu structure comprises receiving the menu structure that provides a list of content and identifies which content of the list of content is renderable by the media player.

18. The method according to claim 1, further comprising, in response to a selection of the second option, identifying which content of the second content source is renderable by the media player.

19. The method according to claim 18, wherein the identifying comprises identifying which content of the second content source is renderable by the media player based on information received from the media player, the information indicating one or more types of content formats that are renderable by the media player.

20. The method according to claim 1, further comprising:
receiving particular content from the second content source; and
buffering the particular content prior to delivering the particular content to the media player.

21. The method according to claim 20, further comprising:
in response to delivering the particular content to the media player, erasing the particular content from the local storage of the interface device.

22. The method according to claim 1, further comprising:
communicating with the media player to determine one or more types of content formats that are renderable by the media player.

23. The method according to claim 1, further comprising:
determining one or more types of content formats that are renderable by the media player based on at least one user input defining a type of the media player.

24. The method according to claim 1, further comprising:
determining one or more types of content formats that are renderable by the media player based on at least one user input defining a type of content that the media player is configured to render.

25. The method according to claim 1, further comprising:
processing a selection of copy protected content available from at least one of the first content source or the second content source;
decrypting the copy protected content to produce decrypted content; and
outputting the decrypted content to the media player.

26. The method according to claim 1, further comprising:
caching one or more file names of content available from the second content source prior to a user selection of the second option.

27. The method according to claim 1, further comprising:
retrieving a list of content available from the second content source upon powering up of the media player; and
caching the list of content in response to retrieving the list of content.

28. The method according to claim 9, wherein the generating the menu comprises:
- generating the first option for accessing the first content stored on the local storage;
- generating the second option for accessing, via a first network that is local to the device, the second content stored on a media server of the first network; and
- generating a third option for accessing, via a second network, third content stored on a web server or proxy.

* * * * *